US 6,603,586 B1

(12) United States Patent
Knobloch

(10) Patent No.: US 6,603,586 B1
(45) Date of Patent: Aug. 5, 2003

(54) SYSTEM AND METHOD SUPPORTING OPTICAL COMMUNICATIONS

(75) Inventor: Craig A. Knobloch, Manchester, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/406,382

(22) Filed: Sep. 27, 1999

(51) Int. Cl.[7] .............................................. H04B 10/00
(52) U.S. Cl. ...................... 359/163; 359/154; 385/24; 385/33
(58) Field of Search ................................. 359/163, 154, 359/174; 385/24, 27, 33, 34, 36; 250/201.1, 551

(56) References Cited

U.S. PATENT DOCUMENTS

| | | | |
|---|---|---|---|
| 4,198,118 A | * | 4/1980 | Porter .......................... 385/24 |
| 4,733,093 A | | 3/1988 | Graves et al. ............... 250/551 |
| 4,744,617 A | * | 5/1988 | Hvezda et al. ................ 385/24 |
| 4,892,376 A | * | 1/1990 | Whitehouse ................. 359/154 |
| 5,218,654 A | * | 6/1993 | Sauter .......................... 385/24 |
| 5,245,680 A | * | 9/1993 | Sauter .......................... 385/24 |
| 6,366,375 B1 | * | 4/2002 | Sakai et al. ................. 359/115 |

\* cited by examiner

Primary Examiner—Nina Tong
(74) Attorney, Agent, or Firm—Baker Botts L.L.P.

(57) ABSTRACT

A system supporting optical communications includes a backplane comprising an optical communication medium. The system also includes a first optical driver coupled to the backplane and operable to communicate optical signals using the optical communication medium. The system also includes a plurality of cards coupled to the backplane. Each card is operable to receive the optical signals from the first optical driver. The system further includes a plurality of first card reflectors disposed at least partially within the optical communication medium. Each card reflector is operable to reflect the optical signals transmitted in the optical communication medium to a corresponding card.

21 Claims, 3 Drawing Sheets

SYSTEM AND METHOD SUPPORTING OPTICAL COMMUNICATIONS

TECHNICAL FIELD OF THE INVENTION

The present invention relates generally to the field of optical communications, and more particularly, to system and method supporting optical communications.

BACKGROUND OF THE INVENTION

Electronic cards include integrated circuits, electronic circuitry and other components for various telecommunications, data communications, and other types of electrical equipment. One card may send data to another card through a backplane or other data bus associated with a card shelf. The backplane may be used to physically connect the cards and provide a communication medium for transferring signals containing data between the cards. The backplane may include conductive traces or wires for communicating the data between the cards. For example, each card may include an edge connector mounted on the edge of the card. The edge connector is connected to electrical circuitry contained on the card and mates with a corresponding backplane connector.

The signals from each card may be converted to optical signals. The optical signals may be transmitted via optical fibers along the backplane to another card and converted back into electrical signals at the receiving card. Each card may include an optical connector insertable within a corresponding optical connector disposed on the backplane.

However, known optical connection systems present certain drawbacks. For example, great care must be taken in uniting the optical connectors to insure proper alignment and consequent optical coupling. Thus, cards may not be freely and rapidly removed and replaced. Additionally, the connecting ends of the optical connectors may be susceptible to contamination or damage after the electronic card has been removed. Also, personnel removing or replacing cards may be exposed to high intensity light emitted by the backplane or by card optical connectors.

SUMMARY OF THE INVENTION

Accordingly, a need has arisen for an improved system and method supporting optical communications. The present invention provides a system and method supporting optical communications that addresses the shortcomings of prior systems and methods.

According to one embodiment of the present invention, a system supporting optical communications includes a backplane comprising an optical communication medium. The system also includes a first optical driver coupled to the backplane and operable to communicate optical signals using the optical communication medium. The system also includes a plurality of cards coupled to the backplane. Each card is operable to receive the optical signals from the first optical driver. The system further includes a plurality of first card reflectors disposed at least partially within the optical communication medium. Each card reflector is operable to reflect the optical signals transmitted in the optical communication medium to a corresponding card.

The present invention may further incorporate a second optical driver for communicating optical signals to each of the cards, synchronous with the optical signals transmitted by the first optical driver. Each card is operable to continue operating substantially uninterrupted according to the optical signals received from the second optical driver if the first optical driver fails.

According to another embodiment of the present invention, an optical connection system includes a first optical medium having a first end operable to emit and receive optical signals, and a second optical medium having a second end operable to emit optical signals to and receive optical signals from the first end of the first optical medium. The system also includes first and second covers pivotally coupled to the first end of the first optical medium. The first and second covers are biased toward each other to shield the first end of the first optical medium when the first optical medium is not coupled to the second optical medium. The system further includes first and second latches disposed adjacent the second optical medium. The first and second latches are operable to receive the first and second covers and bias the first and second covers away from each other to expose the first end of the first optical medium, the first and second latches further operable to secure the first optical medium in registration with the second optical medium.

According to another embodiment of the present invention, a card for coupling to a backplane includes a first optical medium having a first end operable to emit and receive optical signals. The first optical medium is operable to be coupled to a second optical medium of the backplane. The card includes first and second covers pivotally coupled to the first end of the first optical medium and biased toward each other to shield the first optical medium when the first end of the first optical medium is not coupled to the second optical medium. The first and second covers are operable to be biased away from each other to expose the first end of the first optical medium in response to contact with latches coupled to the backplane adjacent the second medium.

Technical advantages of the present invention include transmitting data through a backplane to a plurality of electronic cards using a single optical communication medium. For example, according to one aspect of the present invention, partial mirrors may extend into the optical communication medium to reflect the optical signals to corresponding cards while allowing enough of the optical signals to pass through the partial mirror to serve other cards. Thus, optical signals may be transmitted to each electronic card using a single optical communication medium.

Another technical advantage of the present invention includes providing redundancy of data transmission. For example, according to one aspect of the present invention, primary and redundant optical drivers may be synchronized and light signals from both optical drivers may be combined at the optical connectors for each electronic card. Thus, if either the primary or redundant optical driver source fails, the light from the other optical driver may be used without any effect on the receiving electronic card.

Another technical advantage of the present invention includes providing an optical connection system to protect the optical communication media from contamination when the communication media are not connected. For example, according to one aspect of the present invention, covers may be pivotally coupled to the end of an optical communication medium and biased toward each other to shield the optical communication medium from exposure or contamination when not connected to another optical communication medium. Additionally, a plurality of latches may be disposed adjacent the corresponding optical communication medium and biased toward each other to shield the corresponding optical communication medium from exposure or contamination while not connected to another optical communication medium. The covers and latches facilitate alignment and secure coupling of the optical connectors, and also provide operator protection from high intensity or other light emissions from the optical communication mediums.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings, in which.

DETAILED DESCRIPTION OF THE INVENTION

Figure 1:
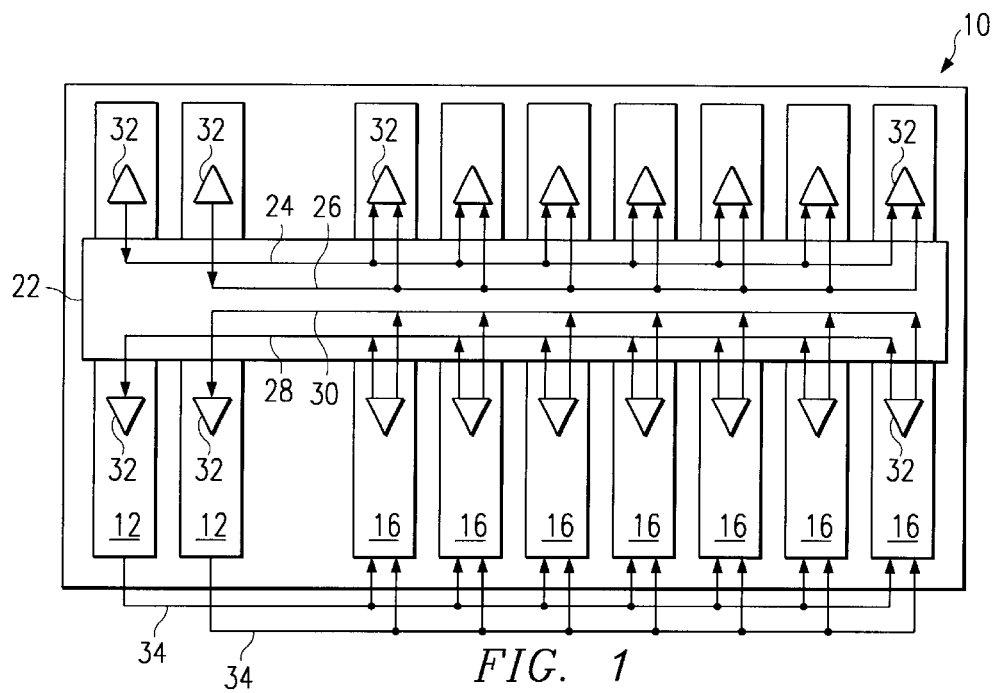
FIG. 1 illustrates an exemplary system containing an optical backplane in accordance with the present invention.

FIG. 1 illustrates a system 10 that includes one or more optical drivers 12, one or more cards 16, and a backplane 22 providing optical communications between optical drivers 12 and cards 16. Optical drivers 12 each include one or more printed circuit boards supporting integrated circuits, electrical circuitry, and other components suitable for communicating optical signals with cards 16 and, possibly, one another. Similarly, cards 16 each include one or more printed circuit boards supporting integrated circuits, electrical circuitry, and other components suitable for communicating optical signals with optical drivers 12 and, possibly, one another. In one embodiment, optical drivers 12 are redundant cards that cooperate in any appropriate manner to control some or all activities of cards 16 within system 10. Although two redundant optical drivers 12 are described, system 10 may include a single or any other number of redundant or non-redundant optical drivers 12 according to particular needs.

Optical drivers 12 and cards 16 may be arranged side by side or in any other manner within a rack or card shelf of system 10. Additionally, although seven cards 16 are illustrated in FIG. 1, any suitable quantity of cards 16 may be provided. System 10 may be any suitable telecommunications, data communications, or other electronic device. In a particular embodiment, system 10 is a telecommunications switching system supporting voice, data, or other appropriate traffic using optical drivers 12, cards 16, and backplane 22.

In one embodiment, backplane 22 includes optical communication media 24, 26, 28, and 30 to communicate optical signals between optical drivers 12 and cards 16. For example only and not by way of limitation, optical communication media 24 and 26 may be "transmit" media used to transfer optical signals from optical drivers 12 to each card 16, and optical communication media 28 and 30 may bet receive media used to transfer optical signals from each card 16 to optical drivers 12. Optical communication media 24, 26, 28, and 30 may each include one or more optical fibers or other suitable media for communicating optical signals according to the operation of system 10. Although media 24, 26, 28, and 30 are discussed, the present invention contemplates a single "transmit" media for both optical drivers 12, a single "receive" media for both optical drivers 12, or a single medium providing the functions of all media 24, 26, 28, and 30. Optical drivers 12 and cards 16 are coupled to backplane 22 using appropriate optical connection systems 32 that allow optical drivers 12 and cards 16 to be removably coupled to backplane 22 to facilitate repair, maintenance, or replacement. Connection systems 32 are described more fully below with reference to FIGS. 4A through 4C.

System 10 also includes one or more clock links 34 between optical drivers 12 and each card 16 for transmitting clock or other timing signals from optical drivers 12 to cards 16. In one embodiment, cards 16 use such clock signals to determine whether to read data from or write data on optical signals transmitted over backplane 22. Optical drivers 12 may generate clock signals according to a system clock or in any other suitable manner, and may use these clock signals or any other suitable timing signals for their internal operations.

In operation, both optical drivers 12 synchronously communicate data to each card 16. For example, for a particular succession of data bits, one optical driver 12 may emit corresponding optical signals that are transmitted to each card 16 using an associated optical connector and optical communication media 24. Synchronously, according to the system clock signal or in any other manner, the other optical driver 12 may emit identical optical signals that are also transmitted to each card 16 using an associated optical connector and optical communication medium 26. Optical drivers 12 are synchronized so that optical signals from both optical drivers 12 may be received substantially simultaneously and combined at each card 16.

In one embodiment, clock signals transmitted using clock links 34 are also synchronized so that each card 16 is signaled to read or ignore data written on the optical signals received from optical drivers 12 according to the operation of system 10. For example, where backplane 22 is a time division multiplex (TDM) backplane 22, each card 16 may read data for a particular time slot corresponding to card 16 within each frame and ignore data for all other time slots, which may contain data intended for other cards 16. In another embodiment, where backplane 22 carries data packets, each card 16 may receive and determine the address of each packet but ignore all packets intended for other cards 16.

Where optical drivers 12 are redundant and one optical driver 12 fails, the optical signal from the other redundant optical driver 12 will still deliver the data to cards 16. An optical detector at each card 16 may have a minimum intensity level below which incoming optical signals cannot be properly read or otherwise detected. Where optical signals from optical drivers 12 are combined at or near card 16, and the minimum intensity level of the optical detector is below the intensity of the optical signals from a single optical driver 12, failure of one optical driver 12 will not affect operation of card 16. Such fault protection capability may be particularly important where system 10 is a device intended for high availability operation. Thus, system 10 provides redundant synchronous optical communication between optical drivers 12 and cards 16.

System 10 also provides redundant synchronous optical communication from cards 16 to optical drivers 12. In one embodiment, clock signals transmitted using clock links 34 are synchronized so that each card 16 is signaled when to write data on the optical signals transmitted to optical drivers 12 according to the operation of system 10. For example, where backplane 22 is a TDM backplane 22, each card 16 may write data on the optical signals in a particular time slot corresponding to card 16. Each card 16 may emit these optical signals for transmission to both optical drivers 12 using the associated optical connector and optical communication media 28 and 30. Thus, both optical drivers 12 receive optical signals from a particular card 16 substantially simultaneously.

Clock signals transmitted using clock links 34 are also synchronized so that optical drivers 12 are signaled to read data written on the optical signals corresponding to a particular card 16 at the proper time according to the operation of system 10. If one optical driver 12 fails, the other optical redundant driver 12 will still receive the optical signals from cards 16. Thus, system 10 provides redundant optical communication between optical drivers 12 and cards 16.

System 10 also provides greater protection from electromagnetic interference associated with optical drivers 12 and cards 16, and the signals communicated between optical drivers 12 and cards 16. For example, because optical signals are used to communicate data between optical drivers 12 and cards 16 rather than electrical signals as in conventional backplane environments, such electromagnetic interference may be substantially eliminated. As a result, data loss and other data errors caused by such interference may be substantially eliminated. Furthermore, electromagnetic emissions from optical drivers 12 and cards 16 are reduced, which may be particularly important in meeting regulatory and other requirements.

Figure 2:
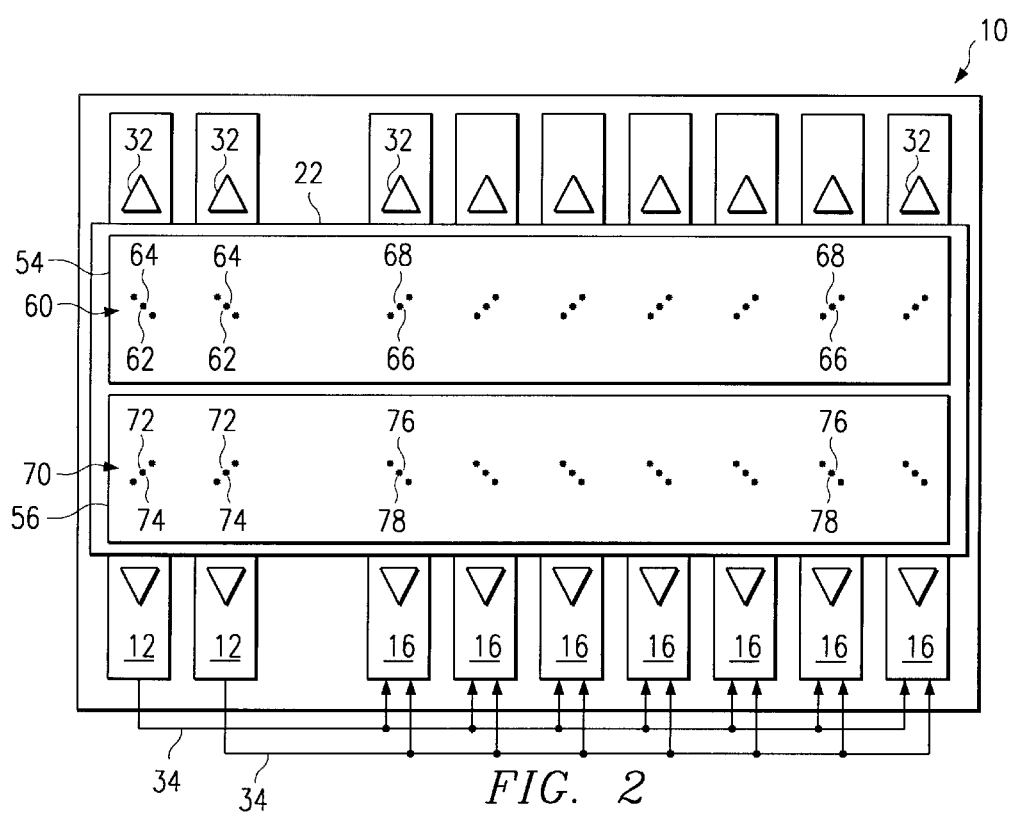
FIG. 2 illustrates an alternative embodiment of a system containing an optical backplane in accordance with the present invention.

FIG. 2 illustrates an alternative embodiment of system 10 in which backplane 22 includes an optical communication medium 54 and an optical communication medium 56 for communicating optical signals between optical drivers 12 and cards 16. Optical communication media 54 and 56 each include a glass, plastic, or other suitable optically transmissive bar for communicating the optical signals.

Optical communication media 54 and 56 include a plurality of reflectors 60 and 70, respectively, to at least partially reflect optical signals transmitted between optical drivers 12 and cards 16. Reflectors 60 and 70 each include a mirror extending at least partially across optical communication media 54 and 56, respectively, such that at least a portion of the optical signal is reflected into and out of media 54 and 56 to each card 16 and optical driver 12. Depending on the location of cards 16 relative to optical drivers 12 within system 10, the associated mirrors may extend as far into media 54 and 56 as necessary to reflect the optical signal without totally obscuring mirrors for other cards 16 or optical drivers 12. Alternatively, the mirrors may be partial mirrors, such that the mirrors may each extend substantially into media 54 and 56 but allow enough of the optical signal to pass through the mirror to serve other cards 16 and optical drivers 12 within system 10. Although mirrors are described, reflectors 60 and 70 may include any suitable milled, polished, or other reflecting surfaces to reflect optical signals communicated using optical communication media 54 and 56 between optical drivers 12 and cards 16.

Reflectors 60 may include driver reflectors 62 each having a reflecting face 64 directed generally toward cards 16 for properly reflecting optical signals transmitted from optical drivers 12 to cards 16. Reflectors 60 may also include card reflectors 66 each having a reflecting face 68 directed generally toward optical drivers 12 to properly reflect optical signals transmitted from optical drivers 12 to cards 16. Similarly, reflectors 70 may include driver reflectors 72 each having a reflecting face 74 directed generally toward cards 16 to properly reflect optical signals transmitted from cards 16 to optical drivers 12. Reflectors 70 may also include card reflectors 76 each having a reflecting face 78 directed generally toward optical drivers 12 for properly reflecting optical signals transmitted from cards 16 to optical drivers 12.

Reflectors 60 and 70 may each be disposed along optical communication media 54 and 56, respectively, in alignment with a corresponding optical driver 12 or card 16, such that optical signals communicated along optical communication media 54 and 56 are reflected at a substantially ninety-degree angle to the optical connectors. However, other suitable locations for one or more reflectors 60 and 70 and corresponding reflecting angles may be used to reflect optical signals transmitted between optical drivers 12 and cards 16.

System 10 illustrated in FIG. 2 operates similarly to system 10 illustrated in FIG. 1, such that both optical drivers 12 synchronously communicate data to each card 16. For example, optical communication medium 54 may be a "transmit" medium used to transfer corresponding optical signals from both optical drivers 12 to each card 16, and optical communication medium 56 may be a "receive" medium used to transfer optical signals from each card 16 to both optical drivers 12. Thus, if one optical driver 12 fails, the other redundant optical driver 12 will still receive the optical signals from cards 16 and transmit the optical signals to each card 16. Although system 10 illustrated in FIG. 2 includes separate "transmit" and "receive" optical communication media for communicating optical signals between optical drivers 12 and cards 16, a single optical communication medium may be used to communicate optical signals between optical drivers 12 and cards 16. For example, a single optical communication medium may be used to provide the functions of both media 54 and 56.

Figure 3:
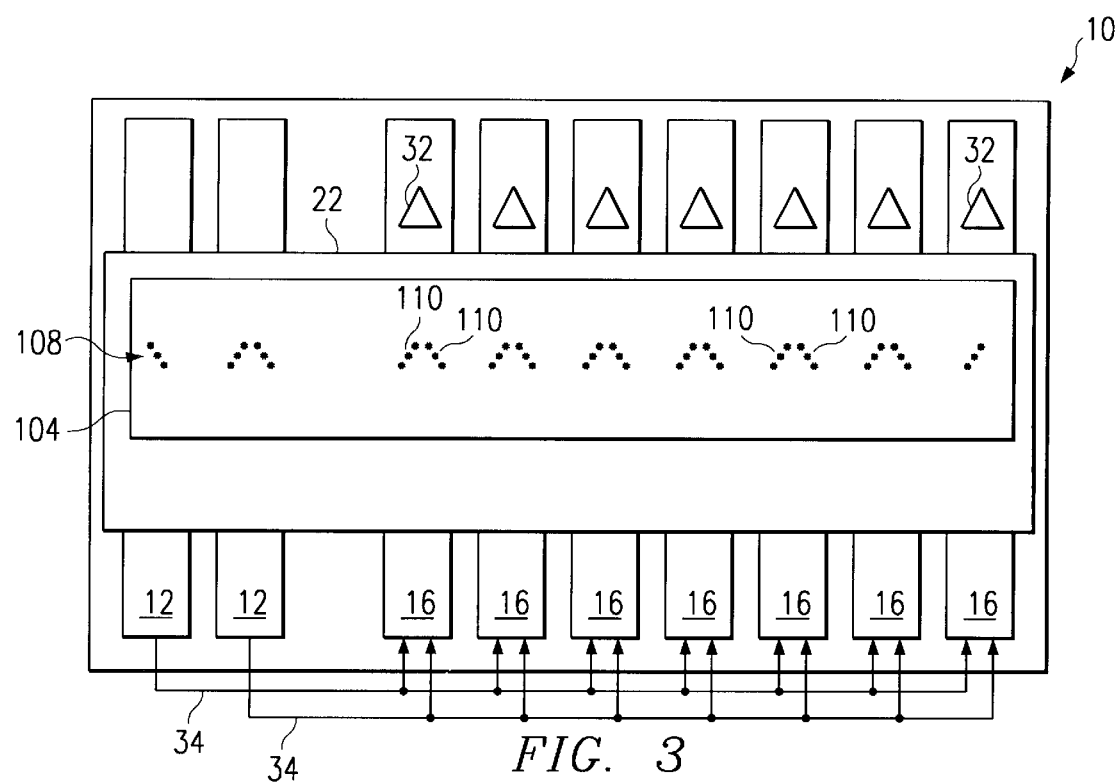
FIG. 3 illustrates another alternative embodiment of a system containing an optical backplane in accordance with the present invention.

FIG. 3 illustrates an alternative embodiment of system 10 in which backplane 22 includes an optical communication medium 104 for communicating optical signals between cards 16, between optical drivers 12, and between cards 16 and optical drivers 12. Optical communication medium 104 includes a glass, plastic, or other suitable optically transmissive bar for communicating the optical signals.

Optical communication medium 104 includes a plurality of reflectors 108 to at least partially reflect optical signals transmitted via optical communication medium 104. Reflectors 108 each include a mirror extending at least partially across optical communication medium 104, such that at least a portion of the optical signal is reflected into and out of medium 104 to cards 16 and optical drivers 12. Depending on the location of each card 16 relative to other cards 16 and optical drivers 12 within system 10, the associated mirrors may extend as far into medium 104 as necessary to reflect the optical signal without totally obscuring mirrors for other cards 16 or optical drivers 12. Alternatively, the mirrors may be partial mirrors, such that the mirrors may each extend substantially into medium 104 but allow enough of the optical signal to pass through the mirror to serve other cards 16 and optical drivers 12. Although mirrors are described, reflectors 108 may include any suitable milled or other reflecting surfaces to reflect optical signals communicated using optical communication medium 104.

Reflectors 108 may include reflecting faces 110 directed generally toward other cards 16 or optical drivers 12 to properly reflect optical signals transmitted from a particular card 16 or optical driver 12 to the other cards 16 or optical drivers 12. Reflectors 108 may each be disposed along optical communication medium 104 in alignment with a corresponding card 16 or optical driver 12 such that optical signals communicated along optical communication medium 104 are reflected at a substantially ninety-degree angle to the optical connectors. However, other suitable locations for one or more reflectors 108 and corresponding reflecting angles may be used to reflect optical signals transmitted between cards 16 and optical drivers 12.

System 10 illustrated in FIG. 3 operates similarly to system 10 illustrated in FIGS. 1 and 2, such that both optical drivers 12 may synchronously communicate data to each card 16 using optical communication medium 104. Additionally, each card 16 may write data on optical signals transmitted to both optical drivers 12 using optical communication medium 104. Thus, system 10 illustrated in FIG. 3 also provides redundant optical communication between optical drivers 12 and cards 16.

System 10 may also provide card-to-card optical communication and driver-to-driver optical communication. For example, in the embodiment illustrated in FIG. 3, reflectors 108 may each be disposed along optical communication medium 104 such that one or more reflecting faces 110 reflect optical signals from a card 16 or optical driver 12 along optical communication medium 104 to a reflector 108 and reflecting face 110 corresponding to another card 16 or optical driver 12, respectively. Analogous card-to-card and driver-to-driver communication may be supported in any of the embodiments described above.

Figure 4A:
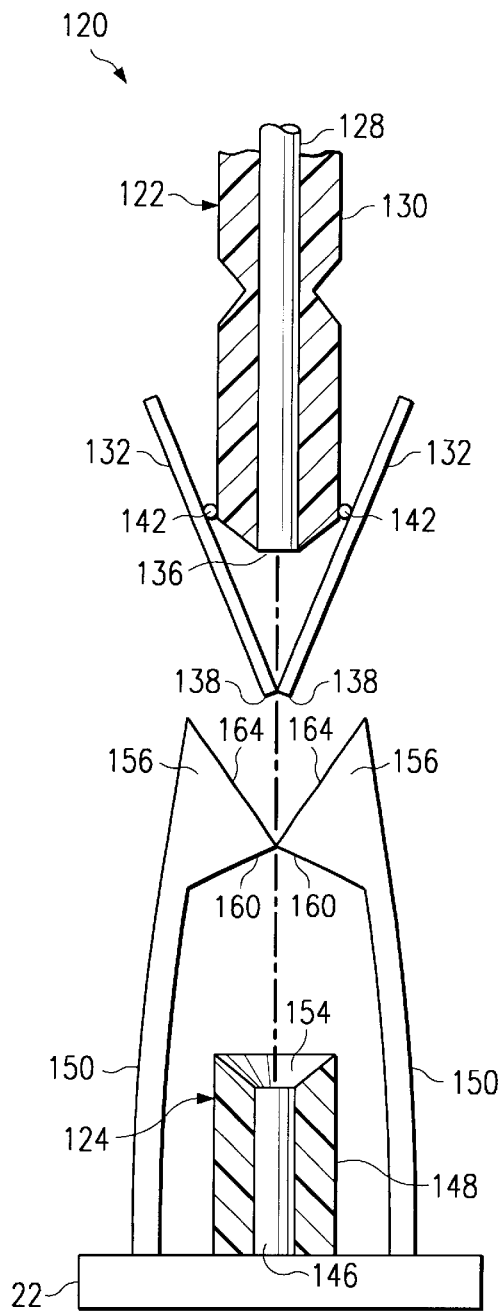
FIGS. 4A through 4C illustrates an exemplary optical connection system for coupling a card to an optical backplane in accordance with the present invention.
Figure 4B:
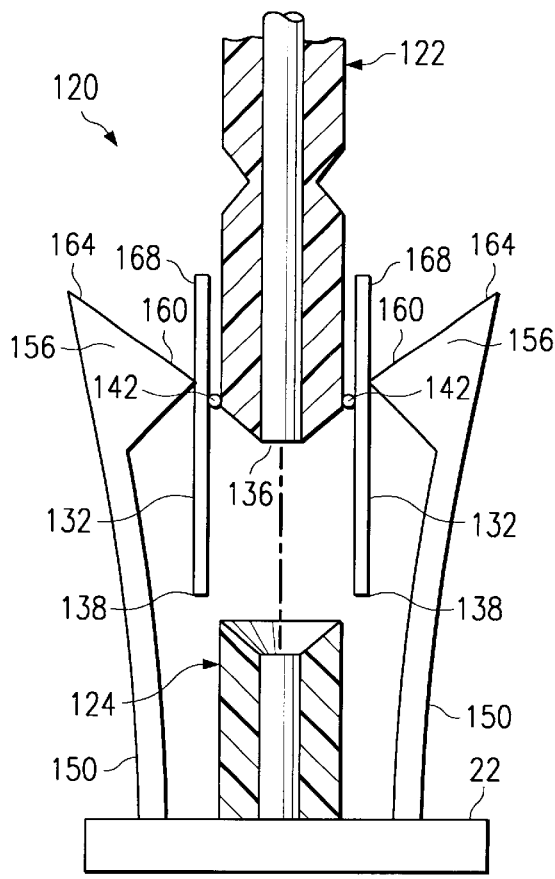
Figure 4C:
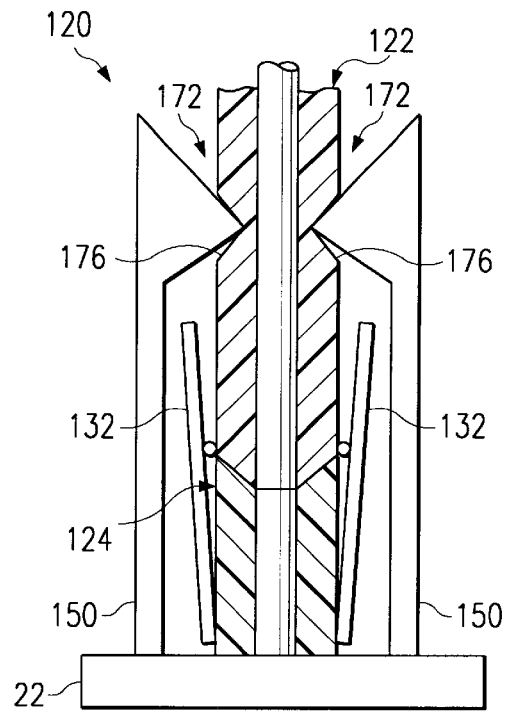

FIGS. 4A through 4C illustrate a connection system 32 for coupling an optical connector 122 and an optical connector 124. In one embodiment, optical connector 122 is associated with card 16 (not explicitly shown) and optical connector 124 is associated with backplane 22, such that system 32 facilitates transmission of optical signals between card 16 and backplane 22. Alternatively, optical connector 122 may be associated with backplane 22 and optical connector 124 may be associated with card 16. The present invention contemplates system 32 being used to connect any suitable optically communicative devices.

Optical connector 122 may include an optical fiber 128 or other suitable optically transmissive material surrounded by a shroud 130 or other suitable protective covering. System 32 includes one or more covers 132 to protect a connecting end 136 of optical connector 122, and to totally or partially contain any light emitted from fiber 128, when optical connector 122 is not connected to or otherwise aligned with optical connector 124. For example, covers 132 may be attached to optical connector 122 such that ends 138 of covers 132 meet to totally or partially shield connecting end 136 of optical connector 122.

Covers 132 may be pivotally coupled to optical connector 122 using hinges 142, although other suitable types of devices or methods may be used to pivotally couple covers 132 to optical connector 122. Connector 122, hinges 142, and covers 132 may be integrally formed or may be in any number of pieces. Hinges 142 may be configured to bias ends 138 of covers 132 toward each other to shield connecting end 136 of optical connector 122. For example only, and not be way of limitation, hinges 142 may include a spring-type mechanism (not explicitly shown) to bias ends 138 toward each other. Those skilled in the art will appreciate that other biasing strategies may be employed without departing from the intended scope of the present invention.

Optical connector 124 may also include an optical fiber 146 or other suitable optically transmissive material surrounded by a shroud 148 or other suitable protective covering. System 32 also includes latches 150 to protect a connecting end 154 of optical connector 124, and to totally or partially contain any light emitted from fiber 146, when optical connector 124 is not connected to or otherwise aligned with optical connector 122. Ends 156 of latches 150 are biased toward each other to shield connecting end 154 of optical connector 124. In one embodiment, latches 150 include protrusions 160 that contact each other, due to tension in latches 150 or otherwise, to shield connecting end 154. As will be described in greater detail in conjunction with FIG. 4B, protrusions 160 also provide receiving surfaces 164 for receiving the ends 138 of covers 132 during insertion of optical connector 122 between latches 150.

Thus, covers 132 and latches 150 cooperate to help prevent contamination or damage to connecting ends 136 and 154 of optical connectors 122 and 124, respectively, when optical connectors 122 and 124 are not connected to each other or otherwise connected to or aligned with another optical medium. Additionally, covers 132 and latches 150 provide protection to maintenance personnel, other equipment, or any other entity against high intensity or other light emissions from optical connectors 122 and 124, respectively.

FIG. 4B illustrates optical connection system 32 during insertion of optical connector 122 between latches 150 for connection to or alignment with optical connector 124. In operation, as optical connector 122 travels toward latches 150, ends 138 of covers 132 are positioned between receiving surfaces 164. As optical connector 122 advances, ends 156 of latches 150 are directed outwardly to allow insertion of optical connector 122 between latches 150. As optical connector 122 travels further toward optical connector 124, protrusions 160 travel beyond hinges 142 toward ends 168 of covers 132. As protrusions 160 are positioned between hinges 142 and ends 168, protrusions 160 apply an inwardly directed force to ends 168 of covers 132, thereby causing ends 138 of covers 132 to move away from each other to expose connecting end 136 of optical connector 122.

For example, as illustrated in FIG. 4A, latches 150 may be configured so that ends 156 are biased toward each other, thereby requiring an outwardly directed force to direct ends 156 away from each other. Inserting optical connector 122 between latches 150 results in an inwardly directed force applied to ends 168 of covers 132 by ends 156 of latches 150. This inwardly directed force causes ends 138 of covers 132 to be directed away from each other.

FIG. 4C illustrates optical connection system 32 connecting or otherwise aligning optical connector 122 with optical connector 124. Latches 150 may be configured such that protrusions 160 are located a predetermined distance from backplane 22 so that an inwardly directed force is applied to ends 168 of covers 132 during insertion of optical connector 122 until ends 138 of covers 132 become located adjacent optical connector 124. Thus, covers 132 remain open until optical connector 122 is disposed adjacent optical connector 124 to prevent covers 132 from closing prior to registration of optical fibers 128 and 146.

In one embodiment, outer surface of optical connector 122 includes retainers 172 for securing optical connector 122 in alignment with optical connector 124. For example, retainers 172 may include recesses 176 formed in shroud 130 for receiving protrusions 160 of latches 150. Thus, latches 150 may be releasably engaged with retainers 172 to secure optical connector 122 in alignment with optical connector 124. Those skilled in the art will appreciate that other securing strategies may be employed without departing from the intended scope of the present invention.

In addition to securing optical connector 122, latches 150 also provide alignment of optical connector 122 with optical connector 124 during insertion of optical connector 122. For example, latches 150 may be symmetrically disposed about optical connector 124 so that optical connector 122 is properly aligned with optical connector 124 as optical connector 122 advances toward optical connector 124. Additionally, covers 132 may be used to prevent misalignment of optical connector 122 and optical connector 124. For example, as optical connector 122 advances toward optical connector 124, ends 138 of covers 132 become positioned adjacent optical connector 124. As ends 168 of covers 132 move beyond protrusions 160, ends 138 are biased toward each other and apply an inwardly directed force to optical connector 124 that helps maintain the alignment of optical connector 122 with optical connector 124. Thus, system 120 provides alignment of optical connector 122 during connection of optical connector 122 and 124 and during subsequent operation of system 10.

Additionally, as described above, latches 150 and covers 132 may be used to provide an initial or coarse alignment of connector 122 with connector 124. A final or more precise alignment of connector 122 with connector 124 may be achieved by configuring ends 136 and 154 of optical connectors 122 and 124, respectively, to include mating profiles. For example, as illustrated in FIGS. 4A through 4C, ends 136 and 154 are configured having mating beveled surface profiles to provide a precise alignment of connector 122 with connector 124. Other suitable profile configurations may also be used with ends 136 and 154 to provide a precise alignment of connector 122 with connector 124.

Although covers 132 and associated components of system 32 are described as being associated with card 16, and latches 150 and associated components of system 32 are described as being associated with backplane 22, covers 132 may be associated with backplane 22 and latches 150 may be associated with card 16 without departing from the intended scope of the present invention.

To disconnect optical connector 122 from optical connector 124, a force may be applied to connector 122 directed away from connector 124 to separate connector 122 from connector 124. As the force is applied to connector 122, movement of connector 122 relative to latches 150 causes the surfaces of recesses 176 disposed toward connector 124 to apply an outwardly directed force to ends 156 of latches 150, thereby disengaging protrusions 160 from retainers 172. After disengagement of latches 150 from retainers 172, optical connector 122 may be further directed away from optical connector 124. As optical connector 122 is withdrawn from between latches 150, ends 138 of covers 132 are biased towards each other to again shield connecting end 136 of optical connector 122. Additionally, as optical connector 122 is withdrawn from between latches 150, latches 150 are biased toward each other to again shield connecting end 154 of optical connector 124. Thus, covers 132 and latches 150 help to prevent contamination or damage to connecting ends 136 and 154 of optical connectors 122 and 124, respectively, after optical connectors 122 and 124 are disconnected. Additionally, covers 132 and latches 150 provide protection to an operator connecting or disconnecting optical connectors 122 and 124 by shielding the operator from high intensity or other light emissions from optical connectors 122 and 124.

Although the present invention and its advantages have been described in detail, it should be understood that various changes, substitutions, and alterations, can be made therein without departing from the spirit and scope of the present invention as defined by the appended claims.

What is claimed is:

1. A system supporting optical communications, comprising:
    a backplane comprising an optical communication medium;
    a first optical driver coupled to the backplane and operable to communicate optical signals using the optical communication medium;
    a plurality of cards coupled to the backplane, each card operable to receive the optical signals from the first optical driver;
    a plurality of first card reflectors disposed at least partially within the optical communication medium, each card reflector operable to reflect the optical signals transmitted in the optical communication medium to a corresponding card; and
    a clock link operable to transmit a clock signal to each card for synchronous reading of the optical signals, each card operable to read the optical signals for corresponding time slots according to the clock signal.

2. The system of claim 1, wherein the optical communication medium is selected from the group consisting of:
    an optical fiber; and
    an optical bar.

3. The system of claim 1, wherein each card reflector comprises a mirror extending at least partially across the optical communication medium.

4. The system of claim 1, further comprising a driver reflector disposed at least partially within the optical communication medium and operable to reflect the optical signals from the first optical driver for transmission in the communication medium.

5. The system of claim 1, further comprising a second optical driver coupled to the backplane and operable to communicate optical signals to each of the cards using the optical communication medium, synchronous with the optical signals transmitted by the first optical driver, wherein each card is operable to continue operating substantially uninterrupted according to the optical signals received from the second optical driver if the first optical driver fails.

6. The system of claim 1, further comprising a second optical driver coupled to the backplane and operable to communicate optical signals to each of the cards using the optical communication medium, synchronous with the optical signals transmitted by the first optical driver, wherein each card is operable to combine the optical signals from the first and second optical drivers.

7. The system of claim 1, wherein each card is operable to transmit optical signals using the optical communication medium, and further comprising a plurality of second card reflectors each operable to reflect the optical signals transmitted by a corresponding card for transmission to another card.

8. A method for communicating optical signals within a system having a backplane, comprising:
    communicating optical signals from a first optical driver to an optical communication medium disposed within the backplane;
    transmitting the optical signals within the optical, communication medium;
    reflecting the optical signals to each of a plurality of cards using a plurality of first card reflectors disposed at least partially within the optical communication medium, each card reflector associated with a corresponding card;

transmitting a clock signal to each card for synchronous reading of the optical signals; and each card reading the optical signals for corresponding time slots according to the clock signal.

9. The method of claim 8, wherein the optical communication medium is selected from the group consisting of:

an optical fiber; and an optical bar.

10. The method of claim 8, wherein reflecting comprises reflecting the optical signals to each of the cards using a plurality of mirrors extending at least partially across the optical communication medium.

11. The method of claim 8, wherein reflecting the optical signals comprises reflecting the optical signals, for transmission in the optical communication medium, using a driver reflector disposed at least partially within the optical communication medium.

12. The method of claim 8, further comprising:

communicating optical signals from a second optical driver to each of the cards using the optical communication medium, synchronous with the optical sign as transmitted by the first optical driver;

receiving the optical signals from the second optical driver at each card; and the cards continuing to operate substantially uninterrupted according to the optical signals received from the first optical driver if the second optical driver fails.

13. The method of claim 8, further comprising:

communicating optical signals from a second optical driver to each of the cards using the optical communication medium, synchronous with the optical signals transmitted by the first optical driver;

receiving the optical signals from the first and second optical drivers at each card; and combining the optical signals from the first and second optical drivers at each card.

14. The method of claim 8, further comprising:

transmitting optical signals from each card to the optical communication medium; and reflecting the optical signals transmitted by each card using a plurality of second card reflectors, each second card reflector reflecting the optical signals transmitted by a corresponding card for transmission to another card.

15. A method for communicating optical signals within a system having a backplane, comprising:

receiving optical signals from a first optical driver at an optical communication medium disposed within the backplane;

transmitting the optical signals within the optical communication medium;

reflecting the optical signals to each of a plurality of cards using a plurality of first card reflectors disposed at least partially within the optical communication medium, each card reflector associated with a corresponding card;

transmitting a clock signal to each card for synchronous reading of the optical signals; and each card reading the optical signals for corresponding time slots according to the clock signal.

16. The method of claim 15, wherein the optical communication medium is selected from the group consisting of:

an optical fiber; and an optical bar.

17. The method of claim 15, wherein reflecting comprises reflecting the optical signals to each of the cards using a plurality of mirrors extending at least partially across the optical communication medium.

18. The method of claim 15, wherein reflecting the optical signals comprises reflecting the optical signals, for transmission in the optical communication medium, using a driver reflector disposed at least partially within the optical communication medium.

19. The method of claim 15, further comprising:

receiving optical signals from a second optical driver;

transmitting the optical signals from the second optical driver within the communication medium synchronous with the optical signals transmitted by the first optical driver; and reflecting the optical signals from the second optical driver to each of the cards, the cards continuing to operate substantially uninterrupted according to the optical signals reflected from the first optical driver if the second optical driver fails.

20. The method of claim 15, further comprising:

receiving optical signals from a second optical driver;

transmitting the optical signals from the second optical driver within the communication medium, synchronous with the optical signals transmitted by the first optical driver; and reflecting the optical signals from the first and second optical drivers to each card, the optical signals from the first and second optical drivers being combined at each card.

21. The method of claim 15, further comprising:

receiving optical signals from each card within the optical communication medium; and reflecting the optical signals transmitted by each card using a plurality of second card reflectors, each second card reflector reflecting the optical signals transmitted by a corresponding card for transmission to another card.

* * * * *